United States Patent [19]

Cullen et al.

[11] Patent Number: 5,029,569

[45] Date of Patent: Jul. 9, 1991

[54] METHOD AND APPARATUS FOR CONTROLLING AN INTERNAL COMBUSTION ENGINE

[75] Inventors: Michael J. Cullen, Dearborn; Benny Vann, Detroit; Jeffry A. Greenberg, Ann Arbor, all of Mich.

[73] Assignee: Ford Motor Company, Dearborn, Mich.

[21] Appl. No.: 581,235

[22] Filed: Sep. 12, 1990

[51] Int. Cl.[5] ........................ F02D 41/18; G01M 15/00

[52] U.S. Cl. .................................... 123/494; 73/118.2; 364/510

[58] Field of Search ............... 123/478, 488, 492, 493, 123/494; 73/118.2; 364/510, 431.04

[56] References Cited

U.S. PATENT DOCUMENTS

| | | | |
|---|---|---|---|
| 4,562,814 | 1/1986 | Abo et al. | 123/494 X |
| 4,644,474 | 2/1987 | Aposchanski et al. | 73/118.2 X |
| 4,694,806 | 9/1987 | Wataya et al. | 123/494 |
| 4,708,115 | 11/1987 | Yamato et al. | 123/494 |
| 4,714,067 | 12/1987 | Staerzl | 123/494 |
| 4,716,876 | 1/1988 | Shinomura et al. | 123/480 |
| 4,750,352 | 6/1988 | Kolhoff | 73/117.3 |
| 4,761,994 | 8/1988 | Sogawa | 73/118.2 |
| 4,846,132 | 7/1989 | Binnewies | 73/118.2 X |
| 4,860,222 | 8/1989 | Schmidt et al. | 364/510 X |
| 4,873,641 | 10/1989 | Nagaishi et al. | 364/431.04 |
| 4,920,790 | 5/1990 | Stiles et al. | 73/118.2 |
| 4,957,088 | 9/1990 | Hosaka | 123/494 X |
| 4,987,888 | 1/1991 | Funabashi et al. | 123/492 X |

FOREIGN PATENT DOCUMENTS

| | | | |
|---|---|---|---|
| 0221443 | 12/1984 | Japan | 123/494 |

*Primary Examiner*—Willis R. Wolfe

*Attorney, Agent, or Firm*—Allan J. Lippa; Roger L. May

[57] ABSTRACT

A mass airflow based control system is provided for an internal combustion engine including a throttle body and an air bypass valve. The system comprises a processor for determining a first value equal to predicted air charge inducted into the engine through the throttle valve, and includes memory for storing an initial value of a ratio of predicted current air charge inducted into the engine to predicted peak air charge capable of being inducted into the engine. The processor determines a second value equal to predicted air charge inducted into the engine through the air bypass valve based on the initial value, and determines a third value equal to predicted peak air charge capable of being inducted into the engine. The processor further determines an actual value of the ratio of predicted current air charge inducted into the engine to predicted peak air charge capable of being inducted into the engine based on the first, second and third values.

22 Claims, 7 Drawing Sheets

METHOD AND APPARATUS FOR CONTROLLING AN INTERNAL COMBUSTION ENGINE

BACKGROUND OF THE INVENTION

The present invention relates generally to an internal combustion engine including a mass airflow based control system and, more particularly, to an improved method and apparatus for controlling an internal combustion engine which is capable of inferring a parameter comprising a ratio of predicted current air charge entering the engine to predicted peak air charge capable of entering the engine.

It is known in the prior art to determine a parameter comprising a ratio of manifold pressure to barometric pressure. Readings of manifold pressure and barometric pressure are employed to determine this parameter. This parameter has the characteristic of going to the value of 1.0 at any altitude and engine speed when the engine maximum airflow is being reached, thus indicating that the driver is demanding maximum torque as opposed to maximum fuel economy. When the ratio approaches the value of 1.0, this indicates to the engine controller that fuel enrichment is required. This parameter, while being advantageous for control systems employing manifold pressure sensors, is not advantageous for mass airflow engine control systems since such systems do not normally employ manifold pressure sensors.

It is also know in the prior art to determine a further parameter, which is essentially equal to the pressure ratio described above. This parameter, which may be called inferred pressure ratio IP, is found by employing the following equation:

$$IP=(AC/(PAC*BP/29.92))$$

wherein:

- AC is the air charge going into the engine measured by a mass airflow meter;
- PAC is the peak air charge capable of going into the engine which is inferred from a look-up table;
- BP is the barometric pressure surrounding the engine; and
- 29.92 is a constant equal to standard barometric pressure.

The parameter IP is also used by an engine control system for fuel enrichment determinations. While this parameter may be determined by a mass airflow control system, it is very sensitive to barometric pressure. Thus, if a control system is employed that infers values of barometric pressure, which are sometimes not as accurate as measured values of barometric pressure, the accuracy of the parameter IP will be directly affected by any inaccurate determinations of inferred barometric pressure.

Accordingly, there is a need for an improved mass airflow based control system which is capable of determining a parameter which can be used for, inter alia, enrichment determinations, but which has little sensitivity to inferred barometric pressure.

SUMMARY OF THE INVENTION

This need is met by the present invention, wherein an airflow based control system is provided which is capable of determining a parameter comprising a ratio of predicted current air charge inducted into an engine to predicted peak air charge capable of being inducted into the engine. This parameter may be employed for, inter alia, fuel enrichment control and, since it has little sensitivity to barometric pressure, its accuracy will not be affected substantially by inaccurate determinations of inferred barometric pressure.

In accordance with a first aspect of the present invention, a method is provided for operating an internal combustion engine comprising the steps of: determining a value equal to predicted current air mass flow inducted into the engine; determining a value equal to predicted peak air mass flow capable of being inducted into the engine; and determining a value of a ratio of predicted current air mass flow inducted into the engine to predicted peak air mass flow capable of being inducted into the engine based on the value of predicted current air mass flow inducted into the engine and the value of predicted peak air mass flow capable of being inducted into the engine.

In accordance with a second aspect of the present invention, a method is provided for operating an internal combustion engine including a throttle valve and an air bypass valve. The method comprises the steps of: storing an initial value of a ratio of predicted current air mass flow inducted into the engine to predicted peak air mass flow capable of being inducted into the engine; determining a first value equal to predicted air mass flow inducted into the engine through the throttle valve; determining a second value equal to predicted air mass flow inducted into the engine through the air bypass valve based on the initial value; determining a third value equal to predicted peak air mass flow capable of being inducted into the engine; and determining an actual value of the ratio of predicted current air mass flow inducted into the engine to predicted peak air mass flow capable of being inducted into the engine based on the first, second and third values.

The step of determining an actual value of the ratio of predicted current air mass flow inducted into the engine to predicted peak air mass flow capable of being inducted into the engine preferably comprises the step of solving the following equation:

$$R = \frac{Ct + Cb}{Cp}$$

wherein:

R is the actual value of the ratio of predicted current air mass flow inducted into the engine to predicted peak air mass flow capable of being inducted into the engine; Ct is the first value of predicted air mass flow inducted into the engine through the throttle valve; Cb is the second value of predicted air mass flow inducted into the engine through the air bypass valve; and Cp is the third value of predicted peak air mass flow capable of being inducted into the engine.

The method preferably further comprises the steps of: determining if the actual value is greater than 1.0; substituting a value equal to 1.0 for the actual value if the actual value is found to be greater than 1.0; updating the second value equal to predicted air mass flow inducted into the engine through the air bypass valve by employing the actual value if the actual value is less than or equal to 1.0 or if greater than 1.0 employing the substituted value; and updating the actual value of the ratio of predicted current air mass flow inducted into the engine to predicted peak air mass flow inducted into the engine based on the first value, the updated second value and the third value.

The step of updating the actual value of the ratio of predicted current air mass flow inducted into the engine to predicted peak air mass flow capable of being inducted into the engine preferably comprises the step of solving the following equation:

$$R = \frac{Ct + Cb}{Cp}$$

wherein:

R is the updated actual value of the ratio of predicted current air mass flow inducted into the engine to predicted peak air mass flow capable of being inducted into the engine; Ct is the first value of predicted air mass flow inducted into the engine through the throttle valve; Cb is the updated second value of predicted air mass flow inducted into the engine through the air bypass valve; and Cp is the third value of predicted peak air mass flow capable of being inducted into the engine.

In accordance with a third aspect of the present invention, a method is provided for operating an internal combustion engine including a throttle valve, and an air bypass valve. The method comprises the steps of: storing an initial value of a ratio of predicted current air mass flow inducted into the engine to predicted peak air mass flow capable of being inducted into the engine; storing first predetermined data comprising predicted air mass flow inducted into the engine via the throttle valve; storing second predetermined data comprising predicted air mass flow inducted into the engine via the air bypass valve; and storing third predetermined data comprising predicted peak air mass flow capable of being inducted into the engine. The method further comprises determining a first value equal to predicted air mass flow inducted into the engine through the throttle valve from the first predetermined data; determining a second value equal to predicted air mass flow inducted into the engine through the air bypass valve from the second predetermined data and based on the initial value; determining a third value equal to predicted peak air mass flow capable of being inducted into the engine from the third predetermined data; and determining an actual value of the ratio of predicted current air mass flow inducted into the engine to predicted peak air mass flow capable of being inducted into the engine by adding the first value to the second value to determine a fourth value, and comparing the fourth value to the third value.

The method preferably further comprises the steps of: determining if the actual value is greater than 1.0; substituting a value of 1.0 for the actual value if the actual value is found to be greater than 1.0; updating the second value equal to predicted air mass flow inducted into the engine through the air bypass valve by employing the actual value if the actual value is less than or equal to 1.0 and if greater than 1.0 employing the substituted value; and updating the actual value of the ratio of predicted current air mass flow inducted into the engine to predicted peak air mass flow capable of being inducted into the engine by adding the first value to the updated second value to determine an updated fourth value and comparing the updated fourth value to the third value.

In accordance with fourth aspect of the present invention, a method is provided for operating an internal combustion engine and comprises the steps of: determining a value equal to predicted current air charge inducted into the engine; determining a value equal to predicted peak air charge capable of being inducted into the engine; and determining a value of a ratio of predicted current air charge inducted into the engine to predicted peak air charge capable of being inducted into the engine based on the value of predicted current air charge inducted into the engine and the value of predicted peak air charge capable of being inducted into the engine.

In accordance with a fifth aspect of the present invention, a method is provided for operating an internal combustion engine including a throttle valve and an air bypass valve. The method comprises the steps of: storing an initial value of a ratio of predicted current air charge inducted into the engine to predicted peak air charge capable of being inducted into the engine; determining a first value equal to predicted air charge inducted into the engine through the throttle valve; determining a second value equal to predicted air charge inducted into the engine through the air bypass valve based on the initial value; determining a third value equal to predicted peak air charge capable of being inducted into the engine; and determining an actual value of the ratio of predicted current air charge inducted into the engine to predicted peak air charge capable of being inducted into the engine based on the first, second and third values.

The step of determining an actual value of the ratio of predicted current air charge inducted into the engine to predicted peak air charge capable of being inducted into the engine preferably comprises the step of solving the following equation:

$$R = \frac{Ct + Cb}{Cp}$$

wherein:

R is the actual value of the ratio of predicted current air charge inducted into the engine to predicted peak air charge capable of being inducted into the engine; Ct is the first value of predicted air charge inducted into the engine through the throttle valve; Cb is the second value of predicted air charge inducted into the engine through the air bypass valve; and Cp is the third value of predicted peak air charge capable of being inducted into the engine.

The method preferably further comprises the steps of: determining if the actual value is greater than 1.0; substituting a value equal to 1.0 for the actual value if the actual value is found to be greater than 1.0; updating the second value equal to predicted air charge inducted into the engine through the air bypass valve by employing the actual value if the actual value is less than or equal to 1.0 and if greater than 1.0 employing the substituted value; and updating the actual value of the ratio of predicted current air charge inducted into the engine to predicted peak air charge capable of being inducted into the engine based on the first value, the updated second value and the third value.

The step of updating the actual value of the ratio of predicted current air charge inducted into the engine to predicted peak air charge capable of being inducted into the engine preferably comprises the step of solving the following equation:

$$R = \frac{Ct + Cb}{Cp}$$

wherein

R is the updated actual value of the ratio of predicted current air charge inducted into the engine to predicted peak air charge capable of being inducted into the engine; Ct is the first value of predicted air charge inducted into the engine through the throttle valve; Cb is the updated second value of predicted air charge inducted into the engine through the air bypass valve; and Cp is the third value of predicted peak air charge capable of being inducted into the engine.

In accordance with an sixth aspect of the present invention, a method is provided for operating an internal combustion engine including a throttle valve, and an air bypass valve. The method comprises the steps of: storing an initial value of a ratio of predicted current air charge inducted into the engine to predicted peak air charge capable of being inducted into the engine; storing first predetermined data comprising predicted air charge inducted into the engine via the throttle valve; storing second predetermined data comprising predicted air charge inducted into the engine via the air bypass valve; and storing third predetermined data comprising predicted peak air charge capable of being inducted into the engine. The method further comprises deriving a first value equal to predicted air charge inducted into the engine through the throttle valve from the first predetermined data; deriving a second value equal to predicted air charge inducted into the engine through the air bypass valve from the second predetermined data and based on the initial value; deriving a third a value equal to predicted peak air charge capable of being inducted into the engine from the third predetermined data; and determining an actual value of the ratio of predicted current air charge inducted into the engine to predicted peak air charge capable of being inducted into the engine by adding the first value to the second value to determine a fourth value and comparing the fourth value to the third value.

The method preferably further comprises the steps of: determining if the actual value is greater than 1.0; substituting a value of 1.0 for the actual value if the actual value is found to be greater than 1.0; updating the second value equal to predicted air charge inducted into the engine through the air bypass valve by employing the actual value if the actual value is less than or equal to 1.0 or if greater than 1.0 the substituted value; and updating the actual value of the ratio of predicted current air charge inducted into the engine to predicted peak air charge capable of being inducted into the engine by adding the first value to the updated second value to determine an updated fourth value and comparing the updated fourth value to the third value.

In accordance with a seventh aspect of the present invention, a system is provided for operating an internal combustion engine including a throttle body and an air bypass valve. The system comprises: processor means for determining a first value equal to predicted air mass flow inducted into the engine through the throttle valve, and includes memory means for storing an initial value of a ratio of predicted current air mass flow inducted into the engine to predicted peak air mass flow capable of being inducted into the engine. The processor means further determines a second value equal to predicted air mass flow inducted into the engine through the air bypass valve based on the initial value, and determines a third value equal to predicted peak air mass flow inducted into the engine. The processor means also determines an actual value of the ratio of predicted current air mass flow inducted into the engine to predicted peak air mass flow capable of being inducted into the engine based on the first, second and third values.

The processor means determines the actual value of the ratio of predicted current air mass flow inducted into the engine to predicted peak air mass flow capable of being inducted into the engine by solving the equation for finding the actual value discussed above with respect to the second aspect of the present invention.

The processor means preferably further determines if the actual value is greater than 1.0 and substitutes a value of 1.0 for the actual value if the actual value is found to be greater than 1.0, and updates the second value equal to predicted air mass flow inducted into the engine through the air bypass valve by employing the actual value if the actual value is less than or equal to 1.0 or if greater than 1.0 employing the substituted value. The processor means further updates the actual value of the ratio of predicted current air mass flow inducted into the engine to predicted peak air mass flow capable of being inducted into the engine based on the first value, the updated second value and the third value.

The processor means determines the updated actual value of the ratio of predicted current air mass flow inducted into the engine to predicted peak air mass flow capable of being inducted into the engine by solving the equation for finding the updated actual value discussed above with respect to the second aspect of the present invention.

In accordance with a eighth aspect of the present invention, a system is provided for operating an internal combustion engine including a throttle body and an air bypass valve. The system comprises: processor means for determining a first value equal to predicted air charge inducted into the engine through the throttle valve, and includes memory means for storing an initial value of a ratio of predicted current air charge inducted into the engine to predicted peak air charge capable of being inducted into the engine. The processor means determines a second value equal to predicted air charge inducted into the engine through the air bypass valve based on the initial value, and determines a third value equal to predicted peak air charge inducted into the engine. The processor means also determines an actual value of the ratio of predicted current air charge inducted into the engine to predicted peak air charge capable of being inducted into the engine based on the first, second and third values.

The processor means preferably determines the actual value of the ratio of predicted current air charge inducted into the engine to predicted peak air charge capable of being inducted into the engine by solving the equation for finding the actual value discussed above with respect to the fourth aspect of the present invention.

The processor means preferably further determines if the actual value is greater than 1.0 and substitutes a value of 1.0 for the actual value if the actual value is found to be greater than 1.0 and updates the second value equal to predicted air charge inducted into the engine through the air bypass valve by employing the actual value if the actual value is less than or equal to 1.0 and if greater than 1.0 employs the substituted value. The processor means further updates the actual value of the ratio of predicted current air charge inducted into the engine to predicted peak air charge capable of being inducted into the engine based on the first value, the updated second value and the third value.

The processor means preferably determines the updated actual value of the ratio of predicted current air charge inducted into the engine to predicted peak air charge capable of being inducted into the engine by solving the equation for finding the updated actual value discussed above with respect to the fourth aspect of the present invention.

It is an object of the present invention to provide a mass airflow based control system which is capable of determining a parameter which can be used for, inter alia, enrichment determinations, but which has little sensitivity to barometric pressure. An advantage is thereby obtained since a parameter employed for enrichment determinations can be more accurately determined in a mass airflow based control system which infers barometric pressure since the parameter has little sensitivity to inferred barometric pressure. A further advantage is obtained since fuel enrichment determinations can be made accurately even if barometric pressure is inferred inaccurately. This and other objects and advantages of the present invention will be apparent from the following description, the accompanying drawings and the appended claims.

Detailed Description of the Invention

Figure 1:
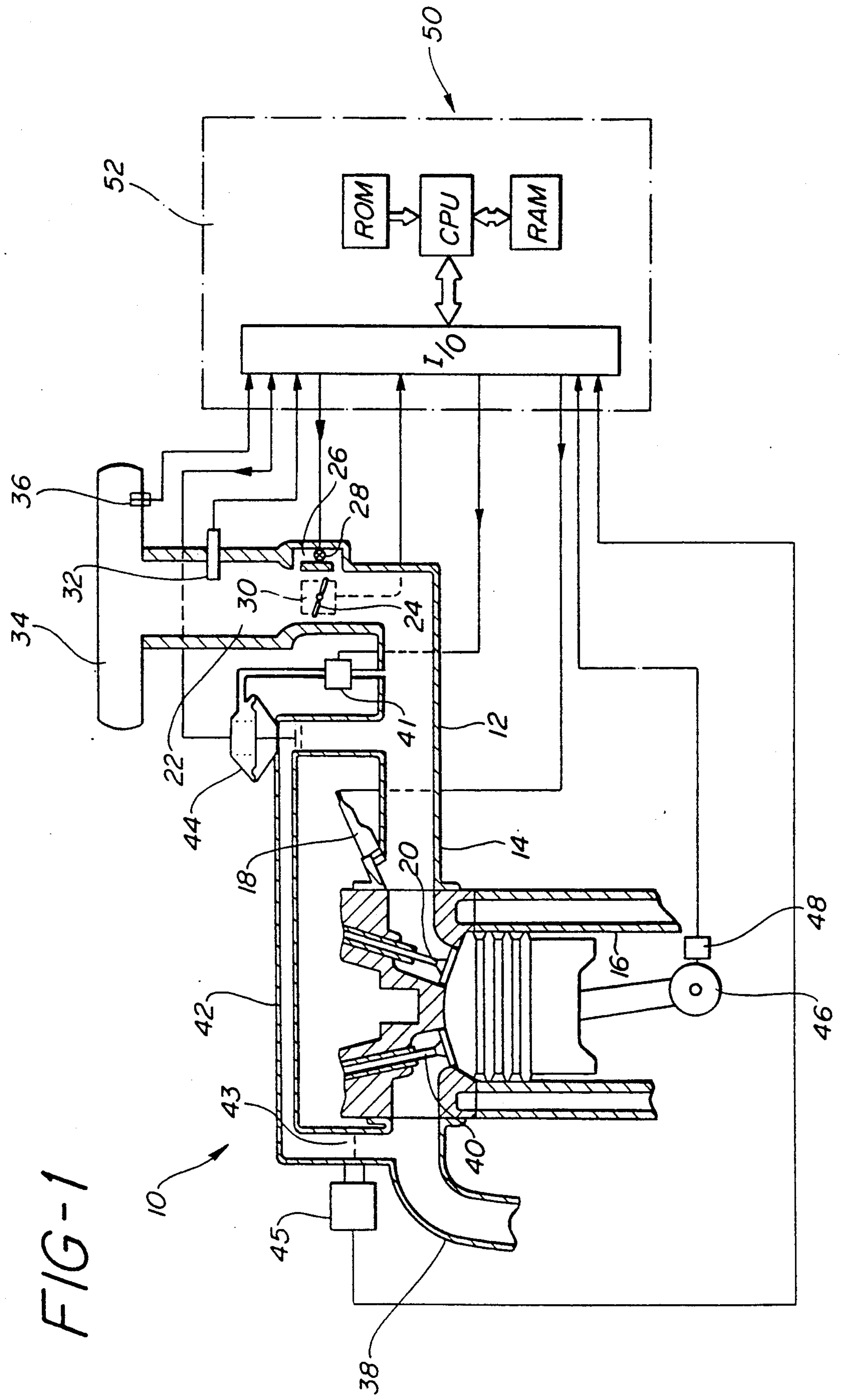
FIG. 1 shows an engine system to which the embodiments of the present invention are applied.

FIG. 1 shows schematically in cross-section an internal combustion engine 10 to which an embodiment of the present invention is applied. The engine 10 includes an intake manifold 12 having a plurality of ports or runners 14 (only one of which is shown) which are individually connected to a respective one of a plurality of cylinders or combustion chambers 16 (only one of which is shown) of the engine 10. A fuel injector 18 is coupled to each runner 14 near an intake valve 20 of each respective chamber 16. The intake manifold 12 is also connected to an induction passage 22 which includes a throttle valve 24, a bypass passage 26 which leads around the throttle valve 24 for, inter alia, idle control, and an air bypass valve 28. A position sensor 30 is operatively connected with the throttle valve 24 for sensing the angular position of the throttle valve 24. The induction passage 22 further includes a mass airflow sensor 32, such as a hot-wire air meter. The induction passage 22 also has mounted at its upper end an air cleaner system 34 which includes an inlet air temperature sensor 36. Alternatively, the sensor 36 could be mounted within the intake manifold 12.

The engine 10 further includes an exhaust manifold 38 connected to each combustion chamber 16. Exhaust gas generated during combustion in each combustion chamber 16 is released into the atmosphere through an exhaust valve 40 and the exhaust manifold 38. In communication with both the exhaust manifold 38 and the intake manifold 12 is a return passageway 42. Associated with the passageway 42 is a pneumatically actuated exhaust gas recirculation (EGR) valve 44 which serves to allow a small portion of the exhaust gases to flow from the exhaust manifold 38 into the intake manifold 12 in order to reduce NOx emissions and improve fuel economy. The EGR valve 44 is connected to a vacuum modulating solenoid 41 which controls the operation of the EGR valve 44.

The passageway 42 includes a metering orifice 43 and a differential pressure transducer 45, which is connected to pressure taps up and downstream of the orifice 43. The transducer 45, which is commercially available from Kavlico, Corp. of Moorpark, Calif., serves to output a signal P which is representative of the pressure drop across the orifice 43.

Operatively connected with the crankshaft 46 of the engine 10 is a crank angle detector 48 which detects the rotational speed (N) of the engine 10.

In accordance with the present invention, a mass airflow based control system 50 is provided which, inter alia, is capable of inferring barometric pressure surrounding the engine 10 and a ratio R of inferred current air charge going into the engine to predicted peak air charge capable of going into the engine, both at a standard pressure and temperature. The system includes a control unit 52, which preferably comprises a microprocessor. The control unit 52 is arranged to receive inputs from the throttle valve position sensor 30, the mass airflow sensor 32, the inlet air temperature sensor 36, the transducer 45, and the crank angle detector 48 via an I/0 interface. The read only memory (ROM) of the microprocessor stores various operating steps, predetermined data and initial values of a ratio R and barometric pressure BP. As will be discussed in further detail below, by employing the stored steps, the predetermined data, the initial values of R and BP, and the inputs described above, the control unit 52 is capable of inferring barometric pressure surrounding the engine 10 and the ratio R.

It is noted that the control system 50 additionally functions to control, for example, the ignition control system (not shown), the fuel injection system including injectors 18, the duty cycle of the air bypass valve 28, and the duty cycle of the solenoid 41, which serves to control the operation of the EGR valve 44. It is also noted that the present invention may be employed with any mass airflow equipped fuel injection system, such as a multiport system or a central fuel injection system. Additionally, the present invention may be employed with any control system which employs an EGR valve and is capable of determining or inferring the mass flow rate of exhaust gases traveling from the exhaust manifold into the intake manifold via the EGR valve.

A brief explanation now follows describing the manner in which the control unit 52 infers barometric pressure surrounding the engine 10. The control unit 52 first receives a value F inputted from the mass airflow sensor 32 which equals the mass of airflow going into the engine 10. This value F is used by the control unit 52 to derive a value Ca equal to the actual air charge going into the engine 10. The value Ca is also considered to be representative of the mass of airflow inducted into the engine 10. An inferred value of air charge Ci going into the engine via the throttle valve 24 and the air bypass valve 28 is then determined by the control unit 52 by employing pre-determined data contained in look-up tables, the current duty cycle of the air bypass valve 28, which is always known to the control unit 52, the ratio R, which is equal to predicted current air charge going into the engine 10 to predicted peak air charge capable of going into the engine 10, and inputs of throttle position, EGR exhaust mass flow rate, and engine speed N. The inferred value Ci of air charge is also considered to be representative of the predicted mass of airflow inducted into the engine 10. Thereafter, the inferred barometric pressure is determined by comparing the actual air charge Ca going into the engine 10 to the inferred air charge Ci. Differences between the two calculations are first attributed to inlet air temperature, which is measured by the sensor 36, and then to a change in barometric pressure, which is the inferred barometric pressure.

Figure 2:
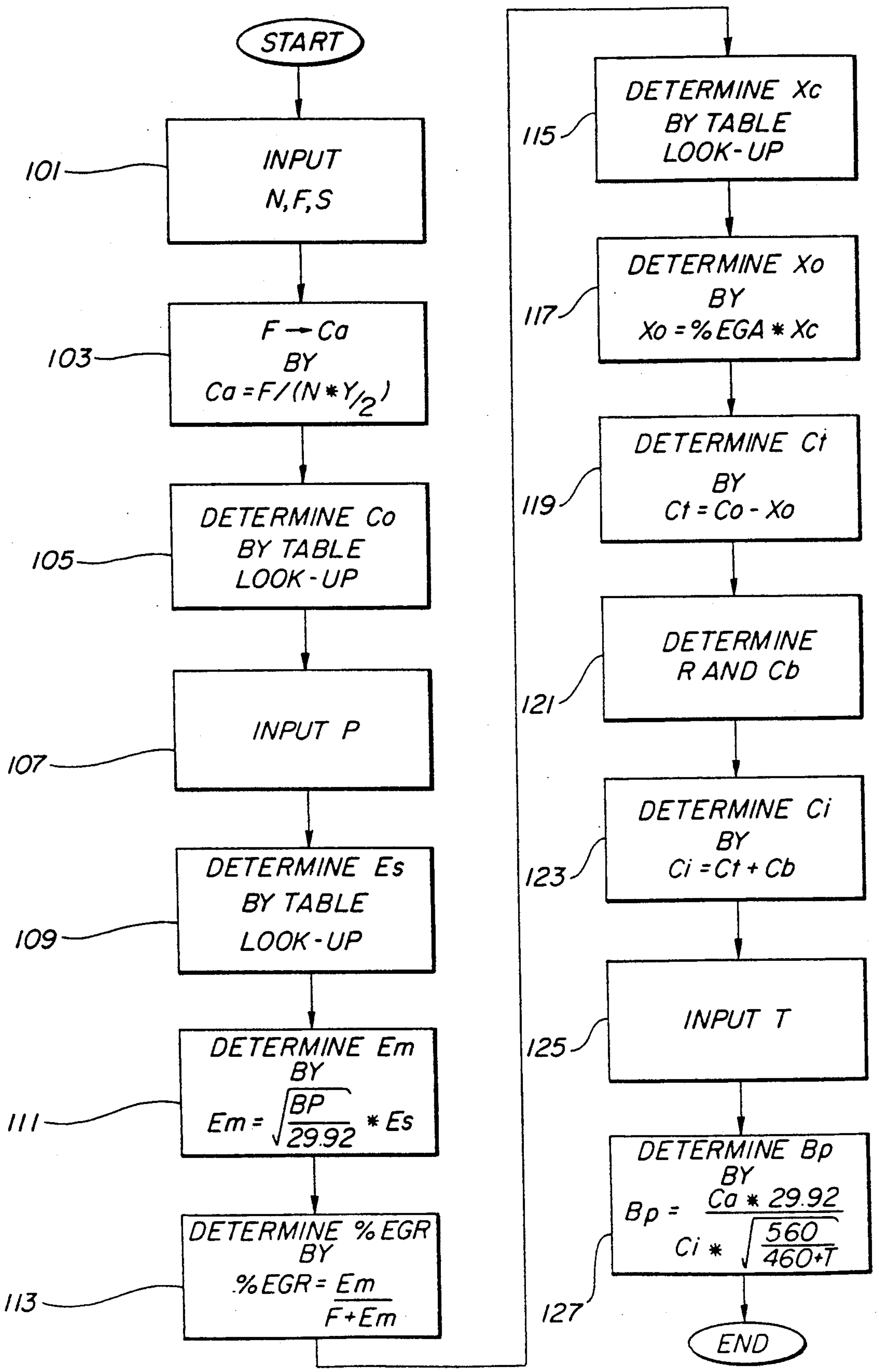
FIG. 2 is a flow chart depicting steps which are employed to infer barometric pressure surrounding an internal combustion engine.

FIG. 2 shows in flow chart form the steps which are performed by the control system 50 of the present invention to infer barometric pressure.

As shown, the first step 101 is to sample input signals from each of the following sensors: the crank angle detector 48 to determine the engine speed N (RPM); the mass airflow sensor 32 to obtain the value F (pounds/minute), which is equal to the mass of airflow going into the engine 10; and the throttle valve position sensor 30 to obtain a value S (degrees), which is indicative of the angular position of the throttle valve 24.

In step 103, the value F is used to obtain the value Ca, which is equal to the actual air charge (pounds/cylinder-fill) going into the engine 10, using the following equation:

$$Ca = F / (N * Y/2)$$

wherein:

F is the value inputted from the mass airflow sensor 32;

N is the engine speed in RPM; and

Y is the number of cylinders in the engine 10.

In step 105, an inferred air charge value Co, equal to the predicted air charge going into the throttle valve 24 at 0% EGR (i.e., no exhaust gases recirculated into the intake manifold 12 via the EGR valve 44) and at a standard pressure and temperature, such as 29.92 inHg and 100 degrees F., respectively, is derived using a table look-up technique. The control unit 52 contains a look-up table recorded in terms of the parameters N, S, and Co (as shown by the graphical representation for four values of N in FIG. 3) for this purposed.

In step 107, the input signal from the transducer 45 is sampled to determine a value P, which is representative of the pressure drop across the orifice 43.

Figure 4:
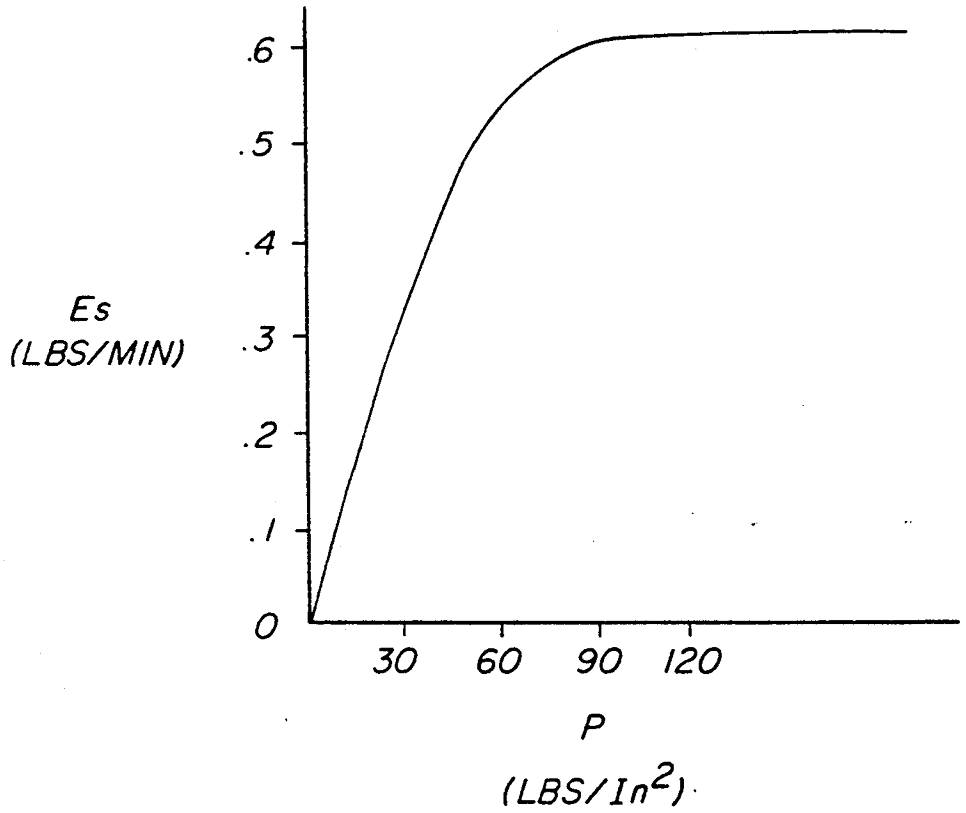
FIG. 4 is a graphical representation of a second table which is recorded in memory in terms of pressure drop P across the orifice and a value Es which is equal to the predicted amount of exhaust gases flowing from the exhaust manifold 38 into the intake manifold 12 via the EGR valve 44 at sea level.

In step 109, a value Es, which is a predicted value of the amount of exhaust gases flowing from the exhaust manifold 38 into the intake manifold 12 via the EGR valve 44 at sea level, is derived using a table look-up technique. The control unit 52 contains a look-up table recorded in terms of two variables, namely, Es and P (as shown by the graphical representation in FIG. 4) for this purpose.

In step 111, a value Em, which is equal to the predicted amount of exhaust gases flowing from the exhaust manifold 38 into the intake manifold 12 via the EGR valve 44 at current barometric pressure is determined by using the following equation:

$$Em = SQRT\,[BP / 29.92] * Es$$

wherein:

BP is equal to barometric pressure; and

Es is equal the amount of exhaust gases flowing from the exhaust manifold 38 into the intake manifold 12 via the EGR valve 44 at sea level.

It is noted, that when the engine 10 is started for the first time, an initial, stored value of BP is retrieved from ROM and employed by the control unit 52 when solving for Em. This initial value of BP is arbitrarily selected, and preferably is equal to a middle, common value of barometric pressure. Thereafter, the last value of inferred barometric pressure BP is used in the above equation for BP. Further, when the engine 10 is turned off, the last value of barometric pressure inferred by the control unit 52 is stored in the control unit 52 in keep alive memory to be used in the initial calculation of Em when the engine is re-started.

In step 113, % EGR is determined by using the following equation:

$$\%EGR = \frac{Em}{F + Em}$$

wherein:

Em is the EGR mass flow rate; and

F is the value inputted from the mass airflow sensor 32.

Figure 5:
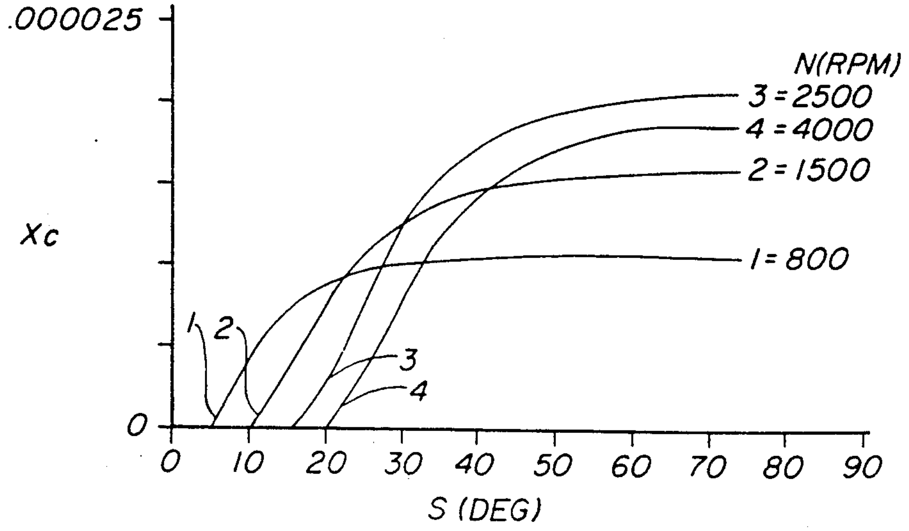
FIG. 5 is a graphical representation of a third table which is recorded in memory in terms of engine speed N, throttle valve angular position S and the value Xc which is equal to (air charge reduction / % EGR)

In step 115, a value Xc, which is indicative of the amount of air charge which is prevented from passing into the intake manifold 12 due to exhaust gases flowing through the EGR valve 44 into the manifold 12, is derived using a table look-up technique. The value Xc is equal to (air charge reduction / % EGR), at standard pressure and temperature. The control unit 52 contains a look-up table recorded in terms of three parameters, namely, N, S and Xc (as shown by the graphical representation for four values of N in FIG. 5) for this purpose.

In step 117, an inferred value Xo, which is equal to the amount of air charge prevented from passing through the throttle valve 24 at standard pressure and temperature due to exhaust gases flowing through the EGR valve 44, is determined by using the following equation:

$$Xo = \%\ EGR * Xc$$

wherein:

% EGR is determine as set forth in step 109, supra; and

Xc=(air charge reduction / % EGR).

In step 119, an inferred air charge value Ct equal to the predicted air charge going into the throttle valve 24 at standard pressure and temperature is determined by using the following equation:

$$Ct = Co - Xo$$

wherein:

Co is equal to the predicted air charge going into the throttle valve 24 at 0 % EGR; and Xo is equal to the predicted amount of air charge prevented from passing through the throttle valve 24 due to exhaust gases flowing into the intake manifold 12 via the EGR valve 44.

In step 121, an inferred air charge value Cb, equal to the predicted air charge going into the engine 10 via the air bypass valve 28 and the ratio R of inferred current air charge going into the engine 10 to predicted peak air charge capable of going into the engine 10, both at standard pressure and temperature, are derived. The steps which are used to determine the value Cb and the ratio R are shown in flow chart form in FIG. 6, and will be discussed in detail below.

In step 123, the inferred value Ci equal to predicted air charge Ci going into the engine via the throttle valve 24 and the air bypass valve 28 is determined by summing Ct and Cb.

In step 125, the input from the inlet air temperature sensor 36 is sampled to obtain the value T, which is representative of the temperature of the air entering the induction passage 22 of the engine 10.

In step 127, barometric pressure BP is inferred by employing the following equation:

$$BP = \frac{Ca * 29.92}{Ci * SQRT[560/(460 + T)]}$$

wherein:

Ca is equal to the actual air charge value;

Ci is equal to the inferred air charge value;

29 92 is standard pressure (inHg);

560 is standard temperature (deg. R); and 460 is a constant which is added to the value T to convert the same from degrees Fahrenheit to degrees Rankine.

It is noted that the control unit 52 continuously updates its value of inferred barometric pressure BP by continuously performing the steps illustrated in FIG. 2 when the engine 10 is operating.

Figure 6:
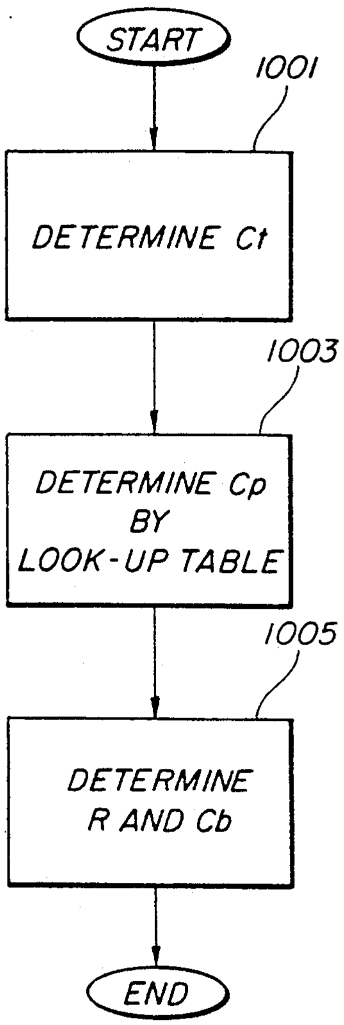
FIG. 6 is a flow chart depicting steps which are used to determine the inferred air charge value Cb, equal to the predicted air charge going into the engine via the air bypass valve, and the ratio R, equal to predicted current air charge going into the engine to predicted peak air charge.

Referring now to FIG. 6, the steps which are used to determine the inferred air charge value Cb, equal to the predicted air charge going into the engine 10 via the air bypass valve 28, and the ratio R, equal to predicted current air charge going into the engine to predicted peak air charge capable of going into the engine, both at standard pressure and temperature, will now be described in detail.

In step 1001, the inferred value Ct of air charge going into the throttle valve 24 is determined as set forth in steps 105–119, supra.

Figure 7:
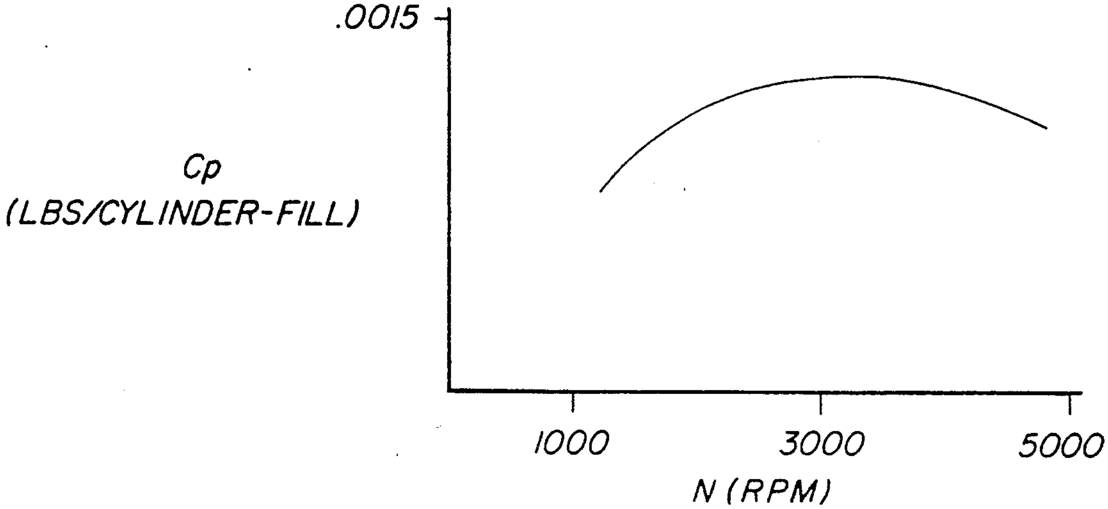
FIG. 7 is a graphical representation of a fourth look-up table which is recorded in terms of engine speed N and predicted peak air charge Cp at wide open throttle.

In step 1003, the predicted value Cp of peak air charge capable of going into the engine at wide open throttle (W.O.T.) is derived by a table look-up technique. The control unit 52 may contain a look-up table recorded in terms of engine speed N and peak air charge at wide open throttle Cp (as shown by the graphical representation in FIG. 7) for this purpose.

Alternatively, Cp may be determined by employing steps 105–119, supra. Cp substantially equals Ct when the throttle valve 24 is at its wide open position. This occurs when the throttle position S is substantially equal to 90 degrees. Thus, by determining the value Ct when S is equal to 90 degrees, Cp may be determined. It is noted that Ct determined at 90 degrees does not take into consideration air charge passing through the air bypass passageway 26 at W.O.T; however, this amount is very small at W.O.T., and is considered to be a negligible amount.

In step 1005, the ratio R and the predicted value Cb are determined by employing a look-up table (as shown by the graphical representation in FIG. 8) which is recorded in terms of the parameters of Ma, R and duty cycle D, (which will be discussed in detail below), and the following equation:

$$R = \frac{Ct + Cb}{Cp}$$

wherein:

R is the ratio of inferred current air charge going into the engine to predicted peak air charge capable of going into the engine;

Cb is the inferred air charge value equal to the predicted air charge going into the air bypass valve 28;

Ct is the inferred air charge value equal to the predicted air charge going into the throttle valve 24; and Cp is the inferred air charge value equal to the predicted peak air charge capable of going into the engine 10.

Figure 9:
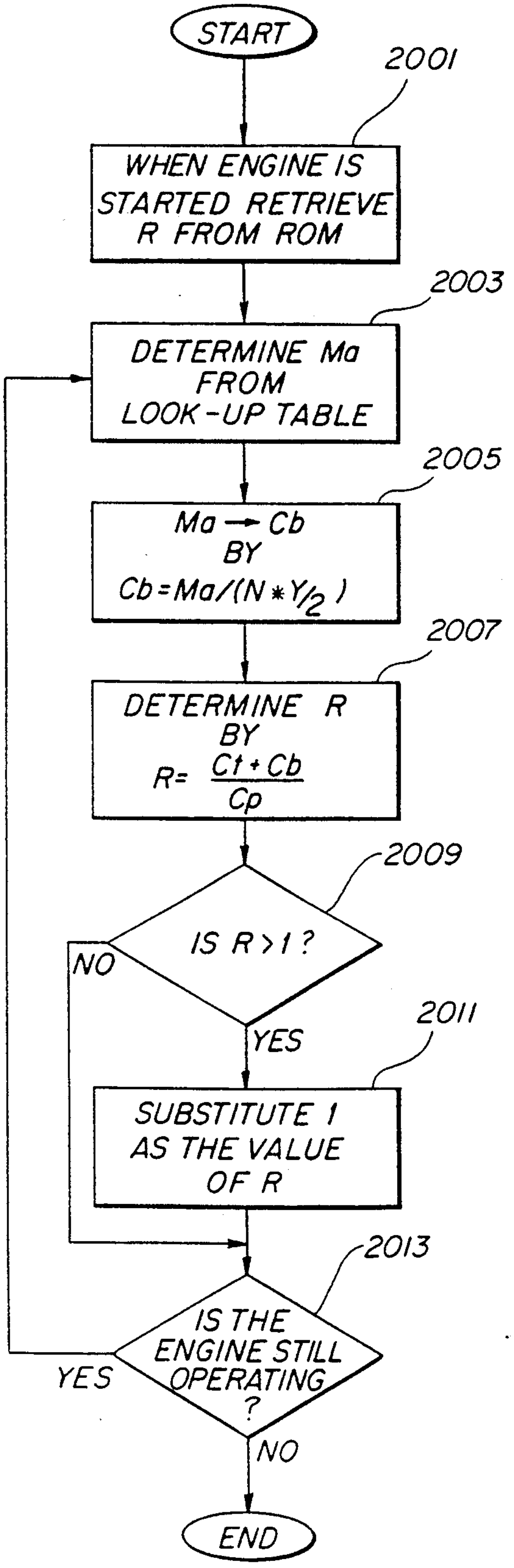
FIG. 9 is a flow chart depicting further steps which are used to determine the ratio R and the inferred air charge value Cb.

The control unit 52 employs the then current duty cycle of the air bypass valve 28, which the control unit controls and thus always has knowledge of, the values of Ct and Cp, and performs further steps, which are shown in flow chart form in FIG. 9, in order to solve for the two unknown parameters R and Cb.

Referring now to FIG. 9, the further steps which are used to determine the parameters R and Cb will now be described in detail.

In step 2001, when the engine 10 is started, the control unit 52 retrieves an initial value of R which is stored in ROM. The initial value of R is arbitrarily selected and preferably comprises a mid-range value.

In step 2003, the control unit 52 determines from the look-up table (graphically shown in FIG. 8) an air mass value Ma, which is representative of the mass of airflow passing through the air bypass valve 28 and which corresponds to the value of R selected in the preceding step and the then current duty cycle D. In step 2005, representative of the predicted air charge passing through the air bypass valve 28 at standard pressure and temperature, by employing the following equation:

$$Cb = Ma / (N * Y/2)$$

wherein:

N is the engine speed in RPM; and

Y is the number of cylinders in the engine.

In step 2007, an updated value of R is determined by employing the equation set forth in step 1005, supra. Cb is equal to the value found in the preceding step, and Ct and Cp are determined as set forth above in steps 1001 and 1003, respectively.

In step 2009, the control unit 52 determines if R is greater than 1.0. If R is greater than 1.0, in step 2011, 1.0 is substituted for the value of R found in step 2007. If, however, R is not greater than 1.0, then the value of R found in step 2007 is employed by the control unit 52 as it proceeds to step 2013.

In step 2013, if the engine 10 is still operating, the control unit 52 employs the value of R found in step 2007, if it is less than or equal to 1.0, or if the value of R is greater than 1.0, it employs 1.0 as the value of R, and proceeds forward to step 2003. The control unit 52 continuously repeats steps 2003–2013 until the engine 10 is turned off. Since the control unit 52 repeats steps 2003–2013 at a very high speed, the control unit 52 is capable of converging upon values which are substantially equal to or equivalent to the actual values of Ma and R before the values of Ct and Cp change over time.

In a second embodiment of the present invention, barometric pressure is inferred by comparing a value Ca', which is equal to the measured mass of airflow inducted into the engine 10, inputted in step 101 supra as value F, with an inferred value Ci', which is equal to predicted mass of airflow inducted into the engine 10. The inferred value Ci' is determined essentially in the same manner that Ci is determined above in steps 105–123, except that modifications have been made to the steps to ensure that Ca' and Ci' are determined in terms of mass of airflow. Further, the parameter R', comprising predicted current air mass flow inducted into the engine 10 to predicted peak air mass flow capable of being inducted into the engine 10 is determined in place of the value of R determined in the first embodiment.

Figure 3:
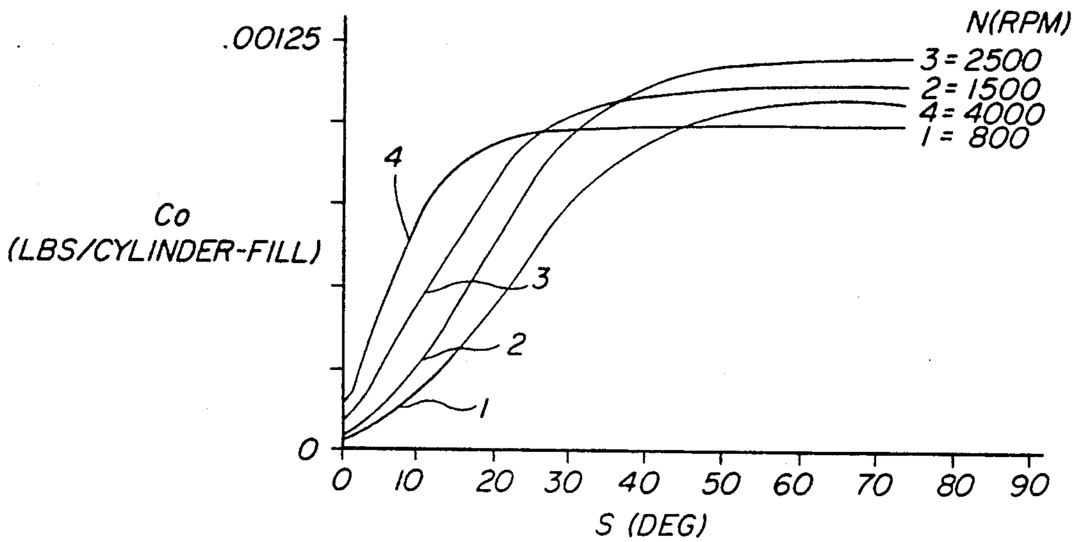
FIG. 3 is a graphical representation of a first table which is recorded in memory in terms of engine speed N, throttle valve angular position S and an inferred air charge value Co equal to the predicted air charge going into the throttle valve at 0% EGR.

In this embodiment, a look-up table is employed (not shown) which is similar to the one shown by the graphical representation in FIG. 3, and is recorded in terms of N, S, and Co', wherein Co' is equal to predicted air mass flow inducted into the intake manifold 12 via the throttle valve 24 at 0% EGR and at a standard temperature and pressure. A further look-up table (not shown) is employed which is similar to the one shown by the graphical representation in FIG. 5, and is recorded in terms of N, S, and Xc', wherein Xc' equals (air mass flow reduction / % EGR). The value of Xc' is used in step 117 to determine the value of Xo', which is equal to the amount of air mass flow which is prevented from passing into the intake manifold 12 due to exhaust gases passing through the EGR valve 44. The value Ct', which is equal to the amount of air mass flow which is inducted into the intake manifold 12 via the throttle valve 24 is then determined by adding the values of Co' and Xo' together.

In order to determine Ci', the value Ct' is added to the value of Cb'. The value Cb' is equal to the value Ma, which is determined in step 2003, supra.

Figure 8:
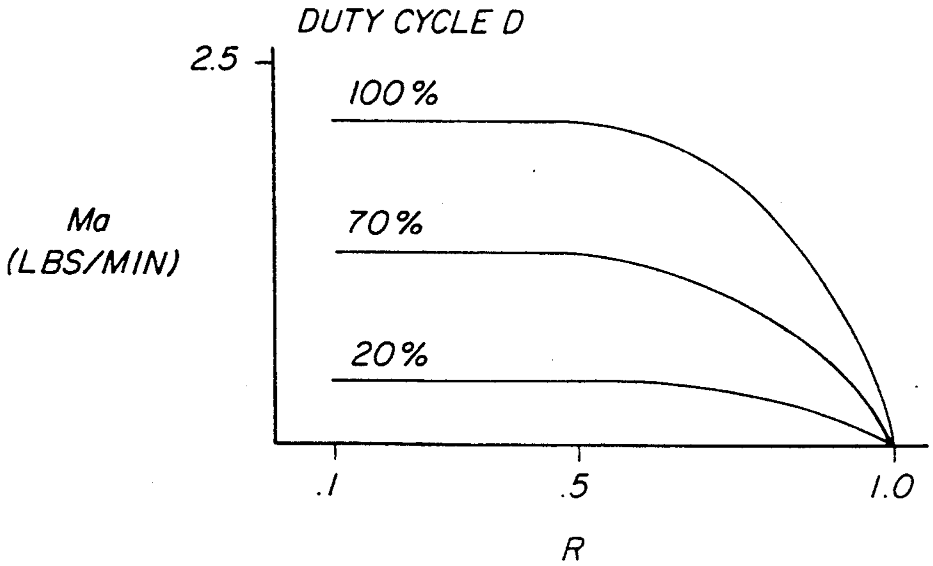
FIG. 8 is a graphical representation of a fifth look-up table which is recorded in terms of the ratio R, the duty cycle D of the air bypass valve, and the predicted value Ma of the mass of air flow passing through the air bypass valve.

The value Cb' may alternatively be determined by modifying the steps illustrated in FIGS. 6 and 9. In step 1001, Ct' is employed in place of Ct. In step 1003, Cp', which is equal to the predicted peak air mass flow inducted into the engine, is employed in place of Cp, and is determined from a look-up table similar to the one shown in FIG. 7, but is recorded in terms of peak air mass flow Cp' and engine speed N. In step 2003, a look-up table similar to the one shown in FIG. 8 is employed and is recorded in terms of Cb' and R', wherein R' is equal to the predicted current air mass flow inducted into the engine 10 to predicted peak air mass flow capable of being inducted into the engine 10. Since air charge values are not employed in the second embodiment, step 2005 is not employed. In step 2007 R is replaced with R', wherein R' is determined by employing the following equation:

$$R' = \frac{Ct' + Cb'}{Cp'}$$

wherein:

Ct' is equal to the predicted air mass flow passing through the throttle valve 24;

Cb' is equal to the predicted air mass flow passing through the air bypass valve 28; and Cp' is equal to the predicted peak air mass flow capable of passing into the engine.

After Cb' is determined, Ct' and Cb' are added together in order to determine Ci'. Barometric pressure is then inferred by employing the following equation:

$$BP = \frac{Ca' * 29.92}{Ci' * \mathrm{SQRT}[560/(460 + T)]}$$

wherein:

Ca' is equal to the actual mass of air flow;

Ci' is equal to the inferred mass of air flow;

29.92 is standard pressure (inHg);

560 is standard temperature (deg. R); and 460 is a constant which is added to the value T to convert the same from degrees Fahrenheit to degrees Rankine.

By the present invention a method and apparatus are set forth for inferring a value R equal to predicted current air charge to predicted peak air charge or, alternatively, equal to predicted current air mass to predicted peak air mass. Since, inferred barometric pressure is only employed to determine the value of Xo or Xo', the value of R is substantially insensitive to inferred barometric pressure.

Figure 10:
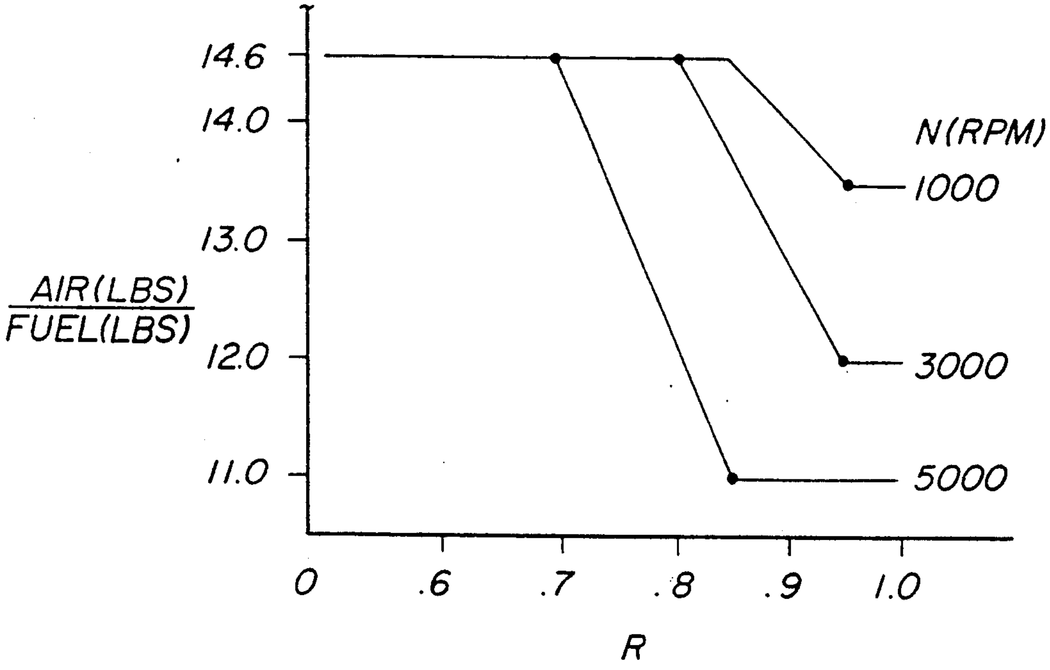
FIG. 10 is a graphical representation of a sixth look-up table contained within the engine control unit which is recorded in terms of the variables R, N and a ratio of air to fuel.

The control unit 52 employs the value R to control, among other things, fuel enrichment. For this purpose, the control unit 52 contains a look-up table recorded in terms of the ratio R, engine speed N and a ratio of air to fuel ( as shown by the graphical representation in FIG. 10). When the value of R approaches 1.0, this indicates that the maximum airflow into the engine is being reached. As a result, enrichment or a decrease in the air to fuel ratio will occur in order to increase power and improve driveability.

It is further contemplated by this invention that the value Ct may be determined from a single look-up table recorded in terms of the parameters N, S, % EGR, and Ct.

It is also contemplated that the sequence in which the control unit 52 performs the steps described above may be altered. For example, the inferred value Cb of air charge going into the air bypass valve may be determined before the inferred value Ct of air charge going into the throttle valve 24.

It is additionally contemplated that the value of Ct could be determined without taking into account the amount of air charge which is prevented from passing through the throttle valve 24 due to exhaust gases flowing through the EGR valve 44 into the manifold 12. In such a system, Co would be employed for Ct. As a result, the ratio R would be determined without taking into account inferred barometric pressure.

Having described the invention in detail and by reference to preferred embodiments thereof, it will be apparent that modifications and variations are possible without departing from the scope of the invention defined in the appended claims.

What is claimed:

1. A method for operating an internal combustion engine comprising the steps of:

determining a value equal to predicted current air mass flow inducted into said engine;

determining a value equal to predicted peak air mass flow capable of being inducted into said engine; and determining a value of a ratio of predicted current air mass flow inducted into said engine to predicted peak air mass flow capable of being inducted into said engine based on said value of predicted current air mass flow inducted into said engine and said value of predicted peak air mass flow capable of being inducted into said engine.

2. A method for operating an internal combustion engine including a throttle valve and an air bypass valve, said method comprising the steps of:

storing an initial value of a ratio of predicted current air mass flow inducted into said engine to predicted peak air mass flow capable of being inducted into said engine;

determining a first value equal to predicted air mass flow inducted into said engine through said throttle valve;

determining a second value equal to predicted air mass flow inducted into said engine through said air bypass valve based on said initial value;

determining a third value equal to predicted peak air mass flow capable of being inducted into said engine; and determining an actual value of said ratio of predicted current air mass flow inducted into said engine to predicted peak air mass flow capable of being inducted into said engine based on said first, second and third values.

3. A method as set forth in claim 2, wherein said step of determining an actual value of said ratio of predicted current air mass flow inducted into said engine to predicted peak air mass flow capable of being inducted into said engine comprises the step of solving the following equation:

$$R = \frac{Ct + Cb}{Cp}$$

wherein:

R is the actual value of said ratio of predicted current air mass flow inducted into said engine to predicted peak air mass flow capable of being inducted into said engine;

Ct is said first value of predicted air mass flow inducted into said engine through said throttle valve;

Cb is said second value of predicted air mass flow inducted into the engine through the air bypass valve; and Cp is said third value of predicted peak air mass flow capable of being inducted into said engine.

4. A method as set forth in claim 2, further comprising the steps of:

determining if said actual value is greater than 1.0;

substituting a value equal to 1.0 for said actual value if said actual value is found to be greater than 1.0;

updating said second value equal to predicted air mass flow inducted into said engine through said air bypass valve by employing said actual value if said actual value is less than or equal to 1.0 or if greater than 1.0 employing said substituted value; and updating said actual value of said ratio of predicted current air mass flow inducted into said engine to predicted peak air mass flow inducted into said engine based on said first value, said updated second value and said third value.

5. A method as set forth in claim 4, wherein said step of updating said actual value of said ratio of predicted current air mass flow inducted into said engine to predicted peak air mass flow capable of being inducted into said engine comprises the step of solving the following equation:

$$R = \frac{Ct + Cb}{Cp}$$

wherein:

R is the updated actual value of said ratio of predicted current air mass flow inducted into said engine to predicted peak air mass flow capable of being inducted into said engine;

Ct is said first value of predicted air mass flow inducted into said engine through said throttle valve;

Cb is said updated second value of predicted air mass flow inducted into the engine through the air bypass valve; and Cp is said third value of predicted peak air mass flow capable of being inducted into said engine.

6. A method for operating an internal combustion engine including a throttle valve, and an air bypass valve, said method comprising the steps of:

storing an initial value of a ratio of predicted current air mass flow inducted into said engine to predicted peak air mass flow capable of being inducted into said engine;

storing first predetermined data comprising predicted air mass flow inducted into said engine via said throttle valve;

storing second predetermined data comprising predicted air mass flow inducted into said engine via said air bypass valve; storing third predetermined data comprising predicted peak air mass flow capable of being inducted into said engine;

determining a first value equal to predicted air mass flow inducted into said engine through said throttle valve from said first predetermined data;

determining a second value equal to predicted air mass flow inducted into the engine through the air bypass valve from said second predetermined data and based on said initial value;

determining a third value equal to predicted peak air mass flow capable of being inducted into said engine from said third predetermined data; and determining an actual value of said ratio of predicted current air mass flow inducted into said engine to predicted peak air mass flow capable of being inducted into said engine by adding said first value to said second value to determine a fourth value, and comparing said fourth value to said third value.

7. A method as set forth in claim 6, further comprising the steps of:

determining if said actual value is greater than 1.0;

substituting a value of 1.0 for said actual value if said actual value is found to be greater than 1.0;

updating said second value equal to predicted air mass flow inducted into said engine through said air bypass valve by employing said actual value if said actual value is less than or equal to 1.0 and if greater than 1.0 employing said substituted value; and updating said actual value of said ratio of predicted current air mass flow inducted into said engine to predicted peak air mass flow capable of being inducted into said engine by adding said first value to said updated second value to determine an updated fourth value and comparing said updated fourth value to said third value.

8. A method for operating an internal combustion engine comprising the steps of:

determining a value equal to predicted current air charge inducted into said engine;

determining a value equal to predicted peak air charge capable of being inducted into said engine; and determining a value of a ratio of predicted current air charge inducted into said engine to predicted peak air charge capable of being inducted into said engine based on said value of predicted current air charge inducted into said engine and said value of predicted peak air charge capable of being inducted into said engine.

9. A method for operating an internal combustion engine including a throttle valve and an air bypass valve, said method comprising the steps of:

storing an initial value of a ratio of predicted current air charge inducted into said engine to predicted peak air charge capable of being inducted into said engine;

determining a first value equal to predicted air charge inducted into said engine through said throttle valve;

determining a second value equal to predicted air charge inducted into said engine through said air bypass valve based on said initial value;

determining a third value equal to predicted peak air charge capable of being inducted into said engine; and determining an actual value of said ratio of predicted current air charge inducted into said engine to predicted peak air charge capable of being inducted into said engine based on said first, second and third values.

10. A method as set forth in claim 9, wherein said step of determining an actual value of said ratio of predicted current air charge inducted into said engine to predicted peak air charge capable of being inducted into said engine comprises the step of solving the following equation:

$$R = \frac{Ct + Cb}{Cp}$$

wherein:

R is the actual value of said ratio of predicted current air charge inducted into said engine to predicted peak air charge capable of being inducted into said engine;

Ct is said first value of predicted air charge inducted into said engine through said throttle valve;

Cb is said second value of predicted air charge inducted into the engine through the air bypass valve; and Cp is said third value of predicted peak air charge capable of being inducted into said engine.

11. A method as set forth in claim 9, further comprising the steps of:

determining if said actual value is greater than 1.0;

substituting a value equal to 1.0 for said actual value if said actual value is found to be greater than 1.0;

updating said second value equal to predicted air charge inducted into said engine through said air bypass valve by employing said actual value if said actual value is less than or equal to 1.0 and if greater than 1.0 employing said substituted value; and updating said actual value of said ratio of predicted current air charge inducted into said engine to predicted peak air charge capable of being inducted into said engine based on said first value, said updated second value, and said third value.

12. A method as set forth in claim 11, wherein said step of updating said actual value of said ratio of predicted current air charge inducted into said engine to predicted peak air charge capable of being inducted into said engine comprises the step of solving the following equation:

$$R = \frac{Ct + Cb}{Cp}$$

wherein:

R is the updated actual value of said ratio of predicted current air charge inducted into said engine to predicted peak air charge capable of being inducted into said engine;

Ct is said first value of predicted air charge inducted into said engine through said throttle valve;

Cb is said updated second value of predicted air charge inducted into the engine through the air bypass valve; and Cp is said third value of predicted peak air charge capable of being inducted into said engine.

13. A method for operating an internal combustion engine including a throttle valve, and an air bypass valve, said method comprising the steps of:

storing an initial value of a ratio of predicted current air charge inducted into said engine to predicted peak air charge capable of being inducted into said engine;

storing first predetermined data comprising predicted air charge inducted into said engine via said throttle valve;

storing second predetermined data comprising predicted air charge inducted into said engine via said air bypass valve; and storing third predetermined data comprising predicted peak air charge capable of being inducted into said engine;

deriving a first value equal to predicted air charge inducted into said engine through said throttle valve from said first predetermined data;

deriving a second value equal to predicted air charge inducted into the engine through the air bypass valve from said second predetermined data and based on said initial value;

deriving a third a value equal to predicted peak air charge capable of being inducted into said engine from said third predetermined data; and determining an actual value of said ratio of predicted current air charge inducted into said engine to predicted peak air charge capable of being inducted into said engine by adding said first value to said second value to determine a fourth value and comparing said fourth value to said third value.

14. A method as set forth in claim 13, further comprising the steps of:

determining if said actual value is greater than 1.0;

substituting a value of 1.0 for said actual value if said actual value is found to be greater than 1.0;

updating said second value equal to predicted air charge inducted into said engine through said air bypass valve by employing said actual value if said actual value is less than or equal to 1.0 or if greater than 1.0 said substituted value; and updating said actual value of said ratio of predicted current air charge inducted into said engine to predicted peak air charge capable of being inducted into said engine by adding said first value to said updated second value to determine an updated fourth value and comparing said updated fourth value to said third value.

15. A system for operating an internal combustion engine including a throttle body and an air bypass valve, said system comprising:

processor means for determining a first value equal to predicted air mass flow inducted into said engine through said throttle valve, and including memory means for storing an initial value of a ratio of predicted current air mass flow inducted into said engine to predicted peak air mass flow capable of being inducted into said engine;

said processor means determining a second value equal to predicted air mass flow inducted into said engine through the air bypass valve based on said initial value, and determining a third value equal to predicted peak air mass flow capable of being inducted into said engine; and said processor means determining an actual value of said ratio of predicted current air mass flow inducted into said engine to predicted peak air mass flow capable of being inducted into said engine based on said first, second and third values.

16. A control system as set forth in claim 15, wherein said processor means determines said actual value of said ratio of predicted current air mass flow inducted into said engine to predicted peak air mass flow capable of being inducted into said engine by solving the following equation $$R = \frac{Ct + Cb}{Cp}$$

wherein:

R is the actual value of said ratio of predicted current air mass flow inducted into said engine to predicted peak air mass flow capable of being inducted into said engine;

Ct is said first value of predicted air mass flow inducted into said engine through said throttle valve;

Cb is said second value of predicted air mass flow inducted into the engine through said air bypass valve; and Cp is said third value of predicted peak air mass flow capable of being inducted into said engine.

17. A control system as set forth in claim 15, wherein said processor means further determines if said actual value is greater than 1.0 and substitutes a value of 1.0 for said actual value if said actual value is found to be greater than 1.0, updates said second value equal to predicted air mass flow inducted into said engine through said air bypass valve by employing said actual value if said actual value is less than or equal to 1.0 or if greater than 1.0 employing said substituted value, and updates said actual value of said ratio of predicted current air mass flow inducted into said engine to predicted peak air mass flow capable of being inducted into said engine based on said first value, said updated second value and said third value.

18. A control system as set forth in claim 17, wherein said processor means determines said updated actual value of said ratio of predicted current air mass flow inducted into said engine to predicted peak air mass flow capable of being into said engine by solving the following equation.

$$R = \frac{Ct + Cb}{Cp}$$

wherein:

R is the updated actual value of said ratio of predicted current air mass flow inducted into said engine to predicted peak air mass flow capable of being inducted into said engine;

Ct is said first value of predicted air mass flow inducted into said engine through said throttle valve;

Cb is said updated second value of predicted air mass flow inducted into the engine through the air bypass valve; and Cp is said third value of predicted peak air mass flow capable of being inducted into said engine.

19. A system for operating an internal combustion engine including a throttle body and an air bypass valve, said system comprising:

processor means for determining a first value equal to predicted air charge inducted into said engine through said throttle valve, and including memory means for storing an initial value of a ratio of predicted current air charge inducted into said engine to predicted peak air charge capable of being inducted into said engine;

said processor means determining a second value equal to predicted air charge inducted into said engine through the air bypass valve based on said initial value, and determining a third value equal to predicted peak air charge inducted into said engine; and said processor means determining an actual value of said ratio of predicted current air charge inducted into said engine to predicted peak air charge capable of being inducted into said engine based on said first, second and third values.

20. A control system as set forth in claim 19, wherein said processor means determines said actual value of said ratio of predicted current air charge inducted into said engine to predicted peak air charge capable of being inducted into said engine by solving the following equation:

$$R = \frac{Ct + Cb}{Cp}$$

wherein:

R is the actual value of said ratio of predicted current air charge inducted into said engine to predicted peak air charge capable of being inducted into said engine;

Ct is said first value of predicted air charge inducted into said engine through said throttle valve;

Cb is said second value of predicted air charge inducted into the engine through the air bypass valve; and Cp is said third value of predicted peak air charge capable of being inducted into said engine.

21. A control system as set forth in claim 19, wherein said processor means further determines if said actual value is greater than 1.0 and substitutes a value of 1.0 for said actual value if said actual value is found to be greater than 1.0, updates said second value equal to predicted air charge inducted into said engine through said air bypass valve by employing said actual value if said actual value is less than or equal to 1.0 and if greater than 1.0 employing said substituted value, and updates said actual value of said ratio of predicted current air charge inducted into said engine to predicted peak air charge capable of being inducted into said engine based on said first value, said updated second value and said third value.

22. A control system as set forth in claim 21, wherein said processor means determines said updated actual value of said ratio of predicted current air charge inducted into said engine to predicted peak air charge capable of being inducted into said engine by solving the following equation:

$$R = \frac{Ct + Cb}{Cp}$$

wherein:

R is said updated actual value of said ratio of predicted current air charge inducted into said engine to predicted peak air charge capable of being inducted into said engine;

Ct is said first value of predicted air charge inducted into said engine through said throttle valve;

Cb is said updated second value of predicted air charge inducted into the engine through the air bypass valve; and Cp is said third value of predicted peak air charge capable of being inducted into said engine.

* * * * *